United States Patent
McLisky

(10) Patent No.: US 8,888,013 B2
(45) Date of Patent: Nov. 18, 2014

(54) DISPENSING MEANS

(75) Inventor: Nigel Haig McLisky, Auckland (NZ)

(73) Assignee: S.C. Johnson & Son, Inc., Racine, WI (US)

( * ) Notice: Subject to any disclaimer, the term of this patent is extended or adjusted under 35 U.S.C. 154(b) by 421 days.

(21) Appl. No.: 10/416,170

(22) PCT Filed: Nov. 19, 2001

(86) PCT No.: PCT/NZ01/00260
§ 371 (c)(1),
(2), (4) Date: May 13, 2003

(87) PCT Pub. No.: WO02/40177
PCT Pub. Date: May 23, 2002

(65) Prior Publication Data
US 2004/0011885 A1    Jan. 22, 2004

(30) Foreign Application Priority Data

Nov. 17, 2000   (NZ) ........................................ 508205
Nov. 17, 2000   (NZ) ........................................ 508212

(51) Int. Cl.
*B05B 17/00* (2006.01)
*B65D 83/38* (2006.01)
*A01M 19/00* (2006.01)

(52) U.S. Cl.
CPC ............. *B65D 83/384* (2013.01); *A01M 19/00* (2013.01); *B65D 83/388* (2013.01)
USPC ................. 239/1; 239/69; 239/289; 239/337; 222/180; 222/649

(58) Field of Classification Search
USPC .......... 222/180, 181.2, 181.3, 649; 239/1, 69, 239/289, 331–334, 337–339
See application file for complete search history.

(56) References Cited

U.S. PATENT DOCUMENTS

| | | | | |
|---|---|---|---|---|
| 3,696,630 A | * | 10/1972 | Bressickello | 62/188 |
| 5,397,028 A | | 3/1995 | Jesadanont | |
| 5,487,502 A | * | 1/1996 | Liao | 239/69 |
| 6,264,548 B1 | * | 7/2001 | Payne et al. | 454/157 |
| 6,540,155 B1 | * | 4/2003 | Yahav | 239/70 |

FOREIGN PATENT DOCUMENTS

| | | |
|---|---|---|
| DE | 3902476 A | 9/1990 |
| FR | 2292528 A | 7/1976 |
| FR | 2433983 A | 4/1980 |
| FR | 2523479 A | 9/1983 |

(Continued)

*Primary Examiner* — Christopher Kim

(57) ABSTRACT

According to the invention there is provided dispensing means having a housing 16 and a spray dispenser 13, the housing 16 having a first part and a second part, the housing being formed such that when it is in use the first part can be secured to a building construction above ground level such that the second part faces away from the first part, there being a space within the housing, the spray dispenser 13 adapted for detachably fitting to the housing within the space, the spray dispenser having a spray emitting portion 14 and a spray material storage portion 15, the spray emitting portion 14 and the spray material storage portion 15 being detachable with respect to one another, the dispensing means being formed such that when it is operational the spray dispenser 13 can, from substantially within the housing 16, automatically release a spray of the spray material to an area outside of the housing.

13 Claims, 4 Drawing Sheets

(56) References Cited

FOREIGN PATENT DOCUMENTS

| FR | 2717156 A | 9/1995 |
| WO | WO 95/29106 | * 11/1995 |
| WO | WO9934266 | * 7/1999 |

* cited by examiner

DISPENSING MEANS

TECHNICAL FIELD

This invention relates to dispensing means. In particular, a preferred form of the invention relates to dispensing means for use in the context of releasing a spray into the air.

BACKGROUND ART

It is known to periodically release a spray of insecticide, perfume, or the like, into a defined area to overcome the presence of unwanted insects or unpleasant odors. This process is normally done manually with the use of an aerosol spray dispenser, and this can prove inconvenient as one must remember to periodically cause a spray to be released Additionally, a further inconvenience is that the manual nature of the process makes it difficult to release a consistent dose in terms of the quantity of the spray. It is accordingly an object of at least one embodiment of the present invention to go at least some way towards addressing the above inconveniences, or to at least provide the public with a useful choice.

In this document the term "comprise", "comprises", or "comprising", if and when used, should be interpreted to be non-exclusive, ie should be interpreted to convey "consisting of or including".

DISCLOSURE OF INVENTION

According to one aspect of the invention there is provided dispensing means having a housing and a spray dispenser, the housing having a first part and a second part, the housing being formed such that when it is in use the first part can be secured to a building construction above ground level such that the second part faces away from the first part, there being a space within the housing, the spray dispenser adapted for detachably fitting to the housing within the space, the spray dispenser having a spray emitting portion and a spray material storage portion, the spray emitting portion and the spray material storage portion being detachable with respect to one another, the dispensing means being formed such that when it is operational the spray dispenser can, from substantially within the housing, automatically release a spray of the spray material to an area outside of the housing.

Preferably the dispensing means is arranged such that the spray can be released to the area outside of the housing substantially vertically and/or substantially horizontally in terms of direction of movement of the spray immediately adjacent the exterior of the housing.

Preferably the dispensing means has locking means for preventing unauthorised removal of the spray dispenser from the housing.

Optionally the locking means can be activated to lock the first and second parts of the housing to one another.

Optionally the first part of the housing comprises a plate adapted for attachment to the building construction.

Optionally the second part of the housing comprises a cover attachable to the first part of the housing.

Preferably the second part of the housing has an aperture through which the spray material can pass when moving from within the housing to outside of the housing.

Optionally the first part of the housing has an internal looped portion, the looped portion being adapted to receive a hook forming part of the spray dispenser.

Optionally the first part of the housing has a stabilizer protruding towards the second part of the housing and arranged such that when the spray dispenser is fitted to the housing the spray dispenser butts against the stabiliser and is thereby assisted in achieving a substantially vertical orientation.

Preferably the spray dispenser fits wholly within the housing.

In a further aspect of the invention there is provided a method of dispensing a spray into an atmosphere, including the steps of:
  i) obtaining dispensing means as described above, and
  ii) setting the spray dispenser into operation to automatically deliver controlled periodic doses of spray into the atmosphere.

DESCRIPTION OF DRAWINGS

Some preferred aspects and embodiments of the invention will now be described by way of example, and/or with reference to the accompanying drawings, of which.

DETAILED DESCRIPTION

Figure 1:
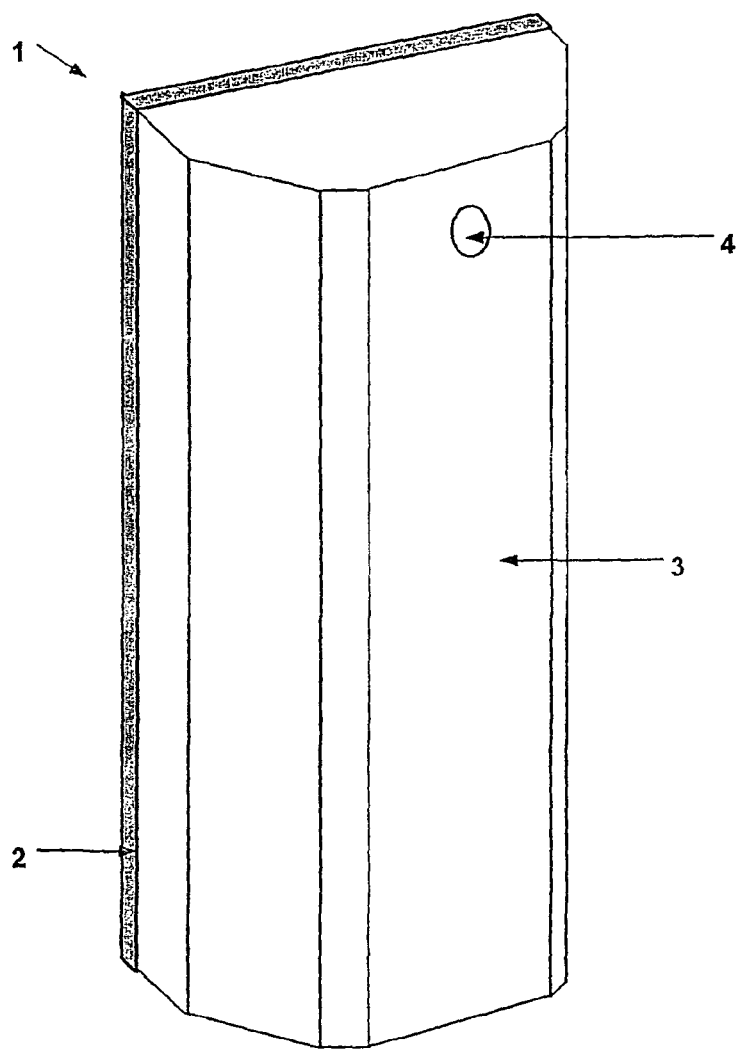
FIG. 1 is a three dimensional view of a housing for use with a spray dispenser.

Referring to FIG. 1, the housing 1 has a first part substantially in the form of a back plate 2, and a second part in the form of a front cover 3. As shown, the cover 3 has an aperture 4 to enable release of a spray material when the housing is in use. The aperture 4 is preferably of sufficient dimensions to enable the spray material to pass therethrough without contacting the housing 1. This is desirable so that the spray material does not, over time, stain, corrode, or otherwise adversely effect the housing 1. The housing 1 is adapted to receive and hold the spray dispenser 5 which is shown in FIG. 2.

Figure 2:
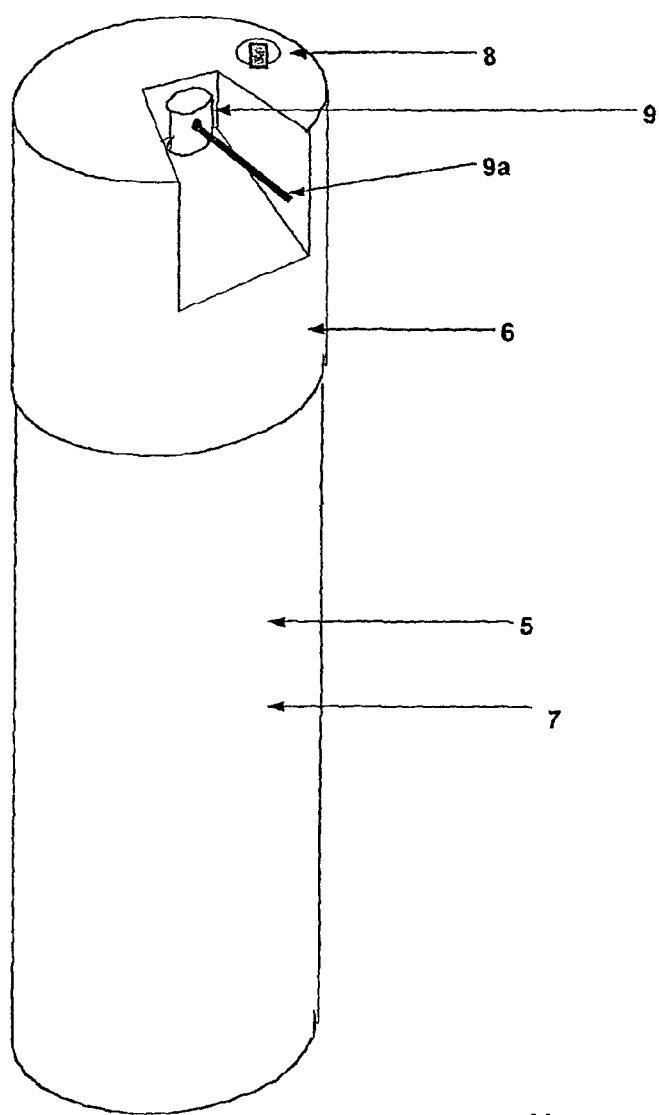
FIG. 2 is a three dimensional view of the spray dispenser mentioned above in relation to FIG. 1.

Referring to FIG. 2, the spray dispenser 5 has a spray emitting portion in the form of a spray head 6, and also has a spray material storage portion in the form of a canister 7 of a substantially cylindrical shape. The spray head 6 and the canister 7 are preferably detachable so that when spray material within the canister 7 is exhausted the canister 7 can be replaced with a new one. The spray head 6 has a switch 8 which can be activated to render the spray dispenser 5 operational. When the spray dispenser 5 is operational the spray head 6 receives a supply of spray material from the canister 7, and releases it as a horizontal spray from an outwardly protruding nozzle 9. As shown, the nozzle 9 may incorporate a short length of tubing 9a for releasing the spray. In other embodiments of the invention the arrangement may be such that the spray is vertical rather than horizontal. When the spray dispenser 5 is fitted to the housing 1 the nozzle 9 is aligned with the housing's aperture 4 so that the spray material can spray outwards of the housing 1 without obstruction by the housing.

The spray head 6 is preferably capable of automatically dispensing periodic metered doses of the spray material as a spray (eg a mist) into the atmosphere surrounding the housing 1. The spray head 6 may have a battery or other power source to energise its internal components. The internal components may include a solenoid valve (not shown) to regulate the flow of spray material from the canister 7 to the spray head 6, and electronics to regulate the opening and closing of the valve in terms of timing and quantity of release of the spray material. The electronics may be arranged such that the spray dispenser 5 will shut down after a predetermined time - ie so that it does not run continuously at times when it is not needed. Preferably the spray dispenser 5 can also be shut down manually. Optionally the spray head 6 may be programmable to influence the working of the electronics.

Figure 2A:
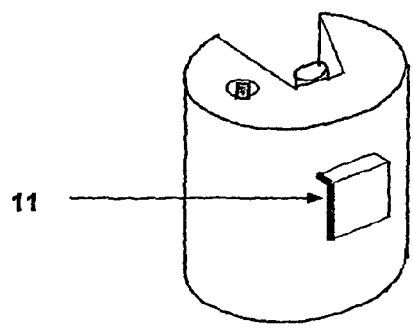
FIG. 2a shows some detail of the spray dispenser of FIG. 2.
Figure 3:
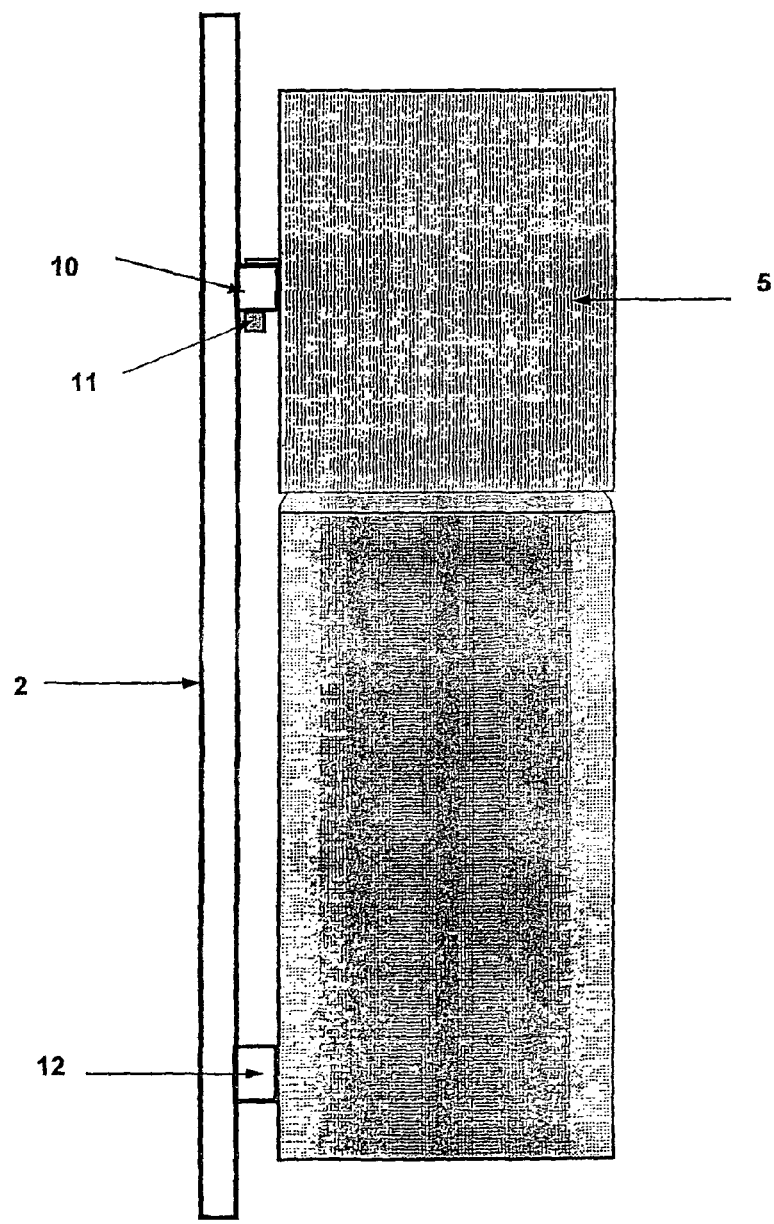
FIG. 3 is a schematic view showing the spray dispenser fitted to part of the housing.

Referring to FIG. 3, the back plate 2 may be secured to a wall in an elevated position. As shown, the back plate 2 has a looped portion 10 (eg a partial or complete ring) for receiving a hook 11, the hook 11 forming part of the spray dispenser 5. The hook is shown in more detail at FIG. 2a. The back plate 2 also has a protruding stabilizer 12 positioned below and spaced from the looped portion 10. When the spray dispenser 5 is fitted to the housing 1 the hook 11 is hooked into the looped portion 10. The lower part of the spray dispenser 5 butts freely against the stabilizer 12 to maintain the spray dispenser 5 in a substantially vertical orientation. The cover 3 can then be clipped or otherwise fastened to the back plate 2 to substantially encapsulate the spray dispenser 5. If desired, the spray dispenser 5 can be removed from the housing and used independently of the housing.

The housing 1 and the spray dispenser 5, when fitted together, may be secured in an elevated fashion against an inside or outside wall of a building. The spray head 6 can then be set to deliver a spray into the surrounding atmosphere as desired. The spray may be of an aerosol type, and may be an insecticide for killing or repelling insects, a perfume, an odor neutraliser, a medicine, or essentially any other suitable substance. In some embodiments of the invention the spray may even be a non-visible gaseous material, and thus the term "spray" as used herein should be interpreted broadly to include this possibility. In some embodiments of the invention the spray dispenser 5 may be adapted to release a spray of more than one substance, each substance being sprayed either simultaneously or consecutively.

Preferably the housing 1 substantially hides the spray dispenser 5 from view when in use, except that the nozzle 9, or a part thereof, may be visible. In some cases the switch 8 may be accessible from outside of the housing 1. The housing 1 can also be locked so that the spray dispenser 5 cannot be removed and/or readily damaged by unauthorised people.

The housing 1 may be formed or coloured (eg by painting) to match the decor of the building with which it is used. Preferably the housing 1 is portable, and is such that it can be secured to (eg by way of screws or the like) and subsequently removed from the building when it is desired to use it elsewhere.

In some embodiments of the invention the housing 1 may have a door to enable access to the spray dispenser 5. The housing 1 may be formed from a plastic, metallic, wooden, or any other suitable material. In some cases the spray dispenser 5 may be powered by a DC supply via a transformer connected the building's main supply.

An advantage of the invention as described with reference to the accompanying drawings is that the spray dispenser can be readily removed from the housing 1. The spray dispenser 5, or a part thereof, is thus not integral with the housing 1.

In some embodiments of the invention the housing for the spray dispenser may be used with a recess in a wall. The spray dispenser can thus at least partially fit within the recess and be substantially hidden from view by way of the front cover. The front cover may or may not be flush will the wall's outer surface.

Figure 4:
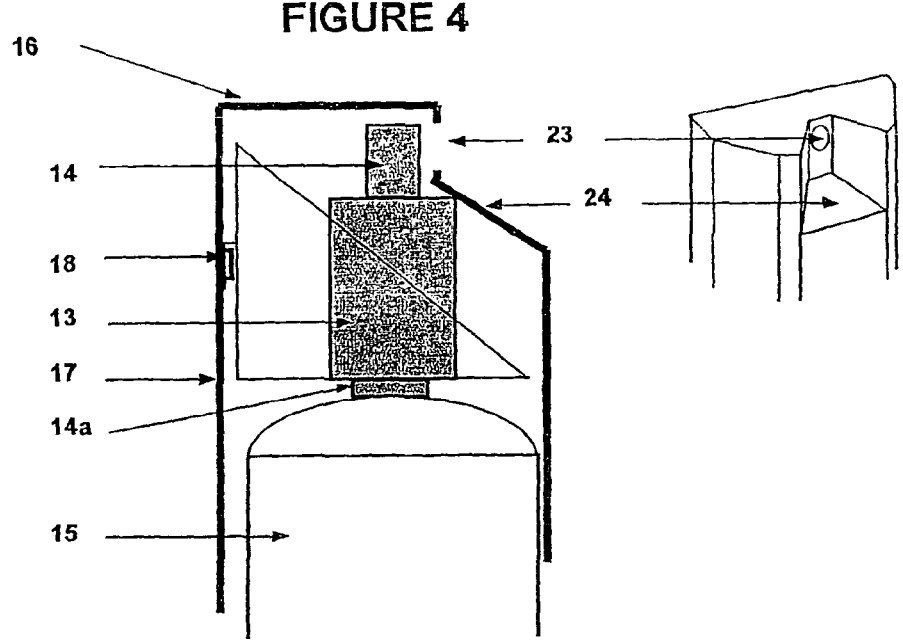
FIG. 4 shows part of an alternative housing and spray dispenser combination.

Referring to FIG. 4, there is shown an alternative spray dispenser and housing combination. In this alternative arrangement the spray dispenser 13 has a spray head 14 and a spray material containing canister 15 (only part of which is shown). The canister 15 can be screw fitted to the spray head 14, and subsequently removed and replaced when the spray material has been exhausted. The housing 16 for the spray dispenser 13 includes a back plate 17 having a pair of horizontally spaced upwardly projecting hooks 18 (only one or which is shown). When in use, the plate 17 is fastened in an elevated position, for example to a wall.

Figure 5:
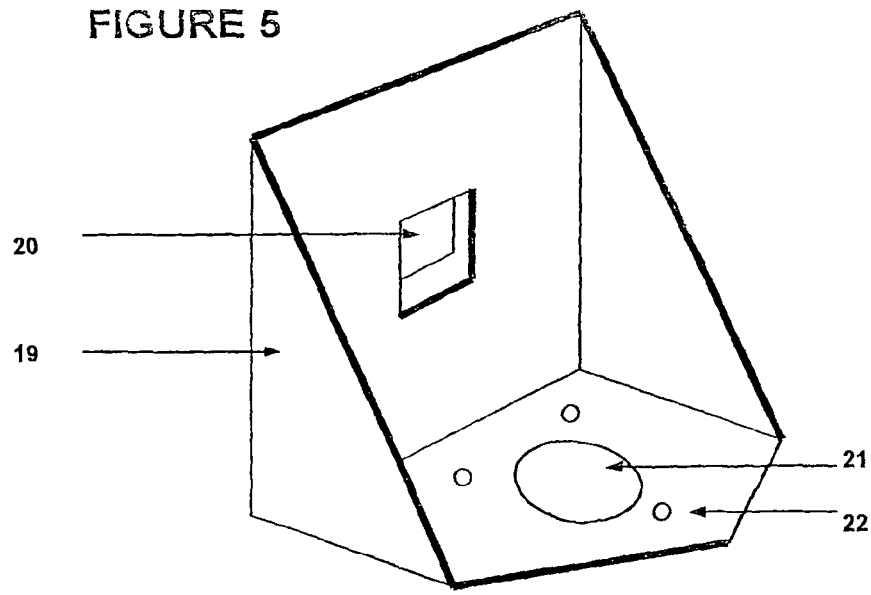
FIG. 5 shows a bracket which forms part of the housing referred to in FIG. 4.

Referring to FIG. 5, the spray dispenser 13 includes a bracket 19 having a vertically oriented aperture 20 and one horizontally oriented aperture 21. The bracket 19 is formed such that it can hang on the back plate 17 by hooking the upwardly projecting hooks 18 through the vertically oriented aperture 20. As shown, the horizontally oriented aperture 21 of the bracket 19 is formed within a shelf 22 of the bracket 19. The spray head 14 can be arranged on the shelf 22 such that a downward fitting 14a (see FIG. 4) of the spray head 14 protrudes through the horizontally oriented aperture 21. The canister 15 can then be screw fitted to the downward fitting of the spray head 14 to maintain the bracket in tight combination with the rest of the spray dispenser 13. The housing 16 has a front cover which can be detachably fitted to the backing plate 17 to substantially conceal the spray dispenser 13. The spray dispenser 13 can be removed from the housing 16 by removing the front cover of the housing 16 and unhooking it from the hooks 18 of the backing plate. The spray head 14 and the canister 15 can subsequently be unscrewed from one another to fit a new canister, etc.

With further reference to FIG. 4, the spray dispenser 13 can emit a spray through an outward aperture 23 in the front cover of the housing 16. The spray head 14 is preferably near enough to the aperture 22 to enable the spray to pass therethrough without contacting the face of the front cover of the housing 16. This is facilitated by the front cover recessing back towards the spray head 14 as indicated at 24. The arrangement ensures that the spray material does not stain or otherwise undesirably compromise the appearance of the housing 1 6. Preferably the spray head 14 is sufficiently spaced from the front cover of the housing 16 so that any drips of spray material from the spray head 14 can fall under gravity within the housing—ie so that they do not run down the exterior of the housing 16. The spacing of the spray head 14 from the front cover, and the dimensions of the outward aperture 23, will depend on the shape of the spray which is produced as it leaves the spray head 14.

It should be appreciated that while the invention has been described herein by way of example, modifications and improvements can occur without departing from the scope of the appended claims.

The invention claimed is:

1. Dispensing means having an integral self contained automatic spray dispenser with an internal battery plus a wall mountable housing, there being means which, when the dispenser is in use, holds the dispenser with respect to the housing such that the dispenser is substantially concealed by the housing such that the dispenser, when in use, automatically and periodically emits a spray of spray material to an atmosphere outside of the housing, and wherein the dispenser is detachable from the housing when desired so that when it is placed apart from the housing and is in use it further automatically and periodically emits a spray of the spray material to a further atmosphere; the automatic dispenser being automatic in that it has means causing, when the dispenser is in use, periodic emission of the sprays without human intervention after being set into operation; the dispenser further characterised in that it has a spray delivery portion and a spray material storage portion, the spray material storage portion holding a supply of the spray material, wherein the spray material storage portion is detachable from the spray delivery portion such that the spray material storage portion and thus the spray material can be replaced, wherein the spray delivery portion includes a spray head having an on/off switch, and wherein the wall mountable housing includes a back plate adapted for direct mounting to a building construction and a front cover having a front surface opposing the back plate, the front surface having an aperture through which the first mentioned spray material can pass when moving from within the housing to outside of the housing.

2. Dispensing means according to claim 1, the front cover being moveable with respect to the back plate to open the housing.

3. Dispensing means according to claim 1, the front cover being moveable with respect to the back plate to open the housing, and wherein the housing has locking means for preventing unauthorized removal of the spray dispenser from the housing.

4. Dispensing means according to claim 1, the front cover being moveable with respect to the back plate to open the housing, and wherein the housing has locking means for preventing unauthorised removal of the spray dispenser from the housing, and wherein the locking means can be activated to lock the front cover and back plate of the housing to one another.

5. Dispensing means according to claim 1, the front cover being moveable with respect to the back plate to open the housing, and wherein the front cover and the back plate of the housing are detachable from one another to facilitate at least one of (i) removal of the spray dispenser from the housing and (ii) insertion of the spray dispenser into the housing.

6. Dispensing means according to claim 1, wherein a part of the housing has an internal loop portion, the loop portion being adapted to receive a hook forming part of the spray dispenser.

7. Dispensing means according to claim 1, the front cover being moveable with respect to the back plate to open the housing, wherein the back plate of the housing has a stabiliser protruding towards the front cover of the housing and arranged such that when the spray dispenser is fitted to the housing the spray dispenser butts against the stabiliser and is thereby assisted in achieving a substantially vertical orientation.

8. Dispensing means according to claim 1, wherein the spray dispenser fits wholly within the housing.

9. Dispensing means according to claim 1, the front cover being moveable with respect to the back plate to open the housing, wherein the spray dispenser has a bracket which can releasably attach to the back plate, the bracket having a shelf for substantially receiving the spray delivery portion, the shelf having an aperture through which the spray delivery portion can engage the spray material storage portion in a screw fit relationship.

10. Dispensing means according to claim 1 wherein the spray dispenser and housing is configured such that the spray is released to the atmosphere outside of the housing substantially horizontally in terms of direction of the movement of the spray relative to the housing.

11. A method of dispensing a spray into an atmosphere, including the steps of:
   i) obtaining dispensing means, the dispensing means having an integral self contained automatic spray dispenser with an internal battery plus a wall mountable housing, there being means which, when the dispenser is in use, holds the dispenser with respect to the housing such that the dispenser is substantially concealed by the housing such that the dispenser, when in use, automatically and periodically emits a spray of spray material to an atmosphere outside of the housing, and wherein the dispenser is detachable from the housing when desired so that when it is placed apart from the housing and is in use it further automatically and periodically emits a spray of the spray material to a further atmosphere; the automatic dispenser being automatic in that it has means causing, when it is in use, emission of the sprays without human intervention after being set into operation; the dispenser further characterised in that it has a spray delivery portion and a spray material storage portion, the spray material storage portion holding a supply of the spray material, wherein the spray material storage portion is detachable from the spray delivery portion such that the spray material storage portion and thus the spray material can be replaced, wherein the spray delivery portion includes a spray head having an on/off switch, and wherein the wall mountable housing includes a back plate adapted for direct mounting to a building construction and a front cover having a front surface opposing the back plate, the front surface having an aperture through which the first mentioned spray material can pass when moving from within the housing to outside of the housing;
   ii) fitting the spray dispenser substantially within the housing against a building construction, and
   iii) setting the spray dispenser into operation to automatically deliver controlled periodic doses of spray into the first mentioned atmosphere.

12. A method according to claim 11, wherein the spray is at least one of an insecticide, a perfume, an odour neutraliser, and a medicine.

13. A method according to claim 11, wherein the spray dispenser is set to automatically cease operation after a predetermined period of time.

* * * * *